Figure 1:
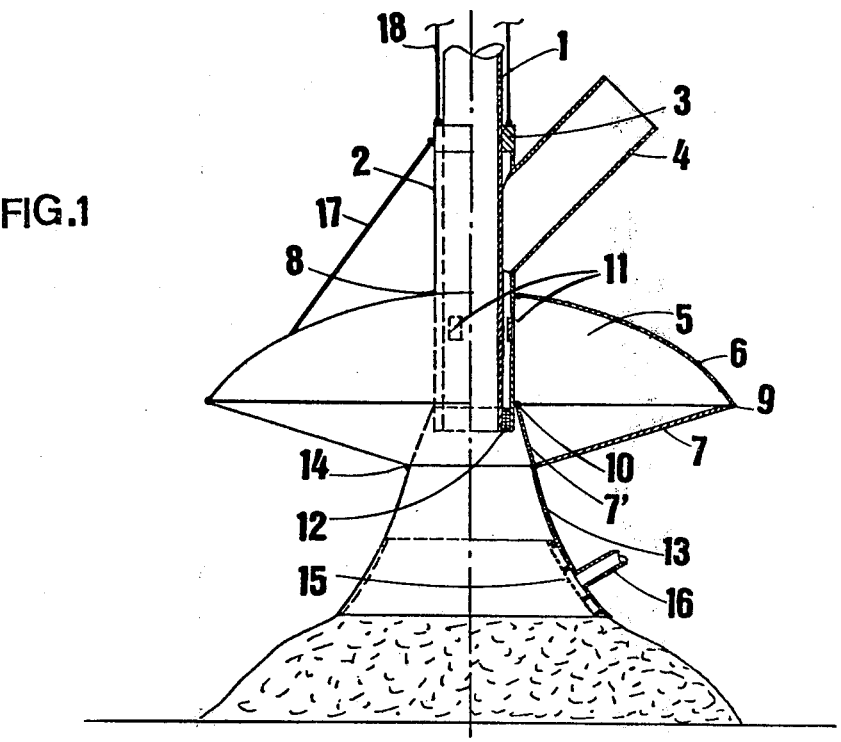

United States Patent [19]

Hanrot et al.

[11] 4,340,136

[45] Jul. 20, 1982

[54] APPARATUS FOR THE DUST-FREE HANDLING OF POWDER SUBSTANCES

[75] Inventors: Jean-Pascal Hanrot, Aix-en-Provence; Jacky Volpeliere, Gardanne, both of France

[73] Assignee: Aluminum Pechiney, Lyons, France

[21] Appl. No.: 151,380

[22] Filed: May 19, 1980

[30] Foreign Application Priority Data

May 18, 1979 [FR] France ................... 79 13543

[51] Int. Cl.³ .................. B65G 69/18; B65G 11/20
[52] U.S. Cl. .......................... 193/15; 141/93; 193/30; 414/291
[58] Field of Search .............. 414/291, 299; 141/93; 193/3, 15, 30, 34

[56] References Cited

U.S. PATENT DOCUMENTS 4,125,195 11/1978 Sasadi .................. 414/291 X
4,248,277 2/1981 Hanrot et al. .................. 141/93

Primary Examiner—Jeffrey V. Nase
Attorney, Agent, or Firm—McDougall, Hersh & Scott

[57] ABSTRACT

Apparatus for handling powder substance, comprising a central feed pipe, an outer pipe, a bell-like member of large section which is disposed around the outer pipe and which communicates therewith by way of filter openings, a corolla-like member which is suspended from the bell-like member and into which open the lower ends of the two pipes, a vacuum in the outer pipe, the bell-like member and the corolla-like member, said corolla member floating on the pile of powder substance by virtue of the support effect of the vacuum in the bell-like member.

13 Claims, 2 Drawing Figures

U.S. Patent

Jul. 20, 1982

4,340,136

APPARATUS FOR THE DUST-FREE HANDLING OF POWDER SUBSTANCES

The present invention concerns a handling apparatus intended for loading powder or granular substances containing a certain proportion of dust, which makes it possible to prevent the dust from flying off and for capturing the dust.

When a pile of powder substance is formed by introducing the powder substance in a downward direction through a vertical pipe which is disposed above the pile, a substantial amount of dust is produced, which is extremely troublesome for the personnel present, particularly when this operation takes place in a closed chamber such as the hold of a ship.

Attempts have therefore been made to remedy this problem by providing the bottom end of the pipe with a flared corolla-like member which rests on the pile of substance and by sucking the dust-charged air into the corolla-like member.

Using this procedure and seeking to ensure that the heavy corolla-like member does not become buried in the material when the pile increases in size, the applicants, in French patent application No. 78 11000 of Apr. 10, 1978, proposed reducing the weight of the equipment by forming a structure of lighter weight, comprising inflatable tube or sausage-like members coupled to the feed pipe.

The present invention concerns another form of a handling apparatus with a vertical pipe, with means for sucking in dust, comprising a terminal corolla-like member which is capable of remaining at the surface of the pile of material when it increases in size without being buried therein.

Apparatus according to the invention essentially comprises:

- a central vertical down pipe for the substance,
- a concentric pipe (referred to as the outer pipe) of larger section than the previous pipe to which it is gripped in its upper part, comprising openings provided with filter screens,
- a bell-like member which is closed around the outer pipe which passes therethrough and to which it is sealingly connected at an upper level and at a lower level which are disposed on respective sides of the filtering openings of the outer pipe, said bell-like member being defined by an upper surface whose outside periphery delimits a constant area, and by a lower deformable surface which is preferably flexible and which is suspended between the outer periphery of the upper surface and the connection at the lower level of the bell-like member to the outer pipe,
- a corolla-like member which is open at its two ends and which flares outwardly downwardly and which is coupled by the periphery of its upper opening to the lower surface of the bell-like member along a line intermediate between the outer pipe and the outer periphery of the upper surface and whose lower opening is smaller in section than the largest horizontal section of the bell-like member,
- a suction conduit permitting a vacuum to be formed in the outer pipe, the bell-like member and the corolla-like member, and
- a system for heightwise positioning of the whole of the apparatus.

The guiding action in respect of the central pipe and the outer pipe is advantageously provided by longitudinal flats, for example, three flats which are arranged at 120° spacings within the outer pipe.

In a preferred alternative, the suction conduit opens into the outer pipe at a level between the upper part and the filtering openings of the outer pipe. The filtering openings which communicate the interior of the bell-like member with the outer pipe are intended to transmit the vacuum to the interior of the bell-like member. They are provided with filter screens in order to prevent dust which, sucked in by the vacuum, rises from the corolla-like member into the outer pipe and then into the suction conduit, from passing into the bell-like member. The screens also have a damping function with respect to the vacuum.

The outer pipe may be extended at its lower end by a net-like or mesh-like portion intended to prevent the lower surface of the bell-like member from being sucked into the space between the two pipes.

The connection between the upper surface of the bell-like member and the outer pipe is pivoted so as to withstand substantial inclination, for example 15°, of the bell-like member with respect to the vertical.

The upper surface of the bell-like member is preferably made of laminated material of rigid polyester. However, other forms or designs are possible, provided that the area defined by the outside periphery remains constant and the lower surface can rise within the upper surface (piston effect). Thus, the upper surface may be made for example of fabric mounted on springs (umbrella) or on inflated sausage-like members.

The lower surface of the bell-like member may be formed by two conical portions of very strong impermeable textile material, the first portion connecting the upper end of the corolla-like member to the periphery of the bell-like member and the second portion connecting the same end to the periphery of the outer pipe. The purpose of this flexible surface is to permit a certain displacement of the corolla-like member positioned on the pile of powder material which regularly rises in level relative to the bell-like member. The bell-like member is periodically raised again so as to restore travel movement to the corolla-like member when the need therefor is felt.

The corolla-like member may be made of rigid material or an inflatable structure comprising juxtaposed sausage-like members. Although the ideal outline thereof is a parabola, which would give it the best theoretical stability by lowering its centre of gravity, in practice, the outline thereof comprises successive curved and rectilinear portions which approximately form a parabolic configuration. Their inclination to the horizontal decreases in moving downward along the outline. Preferably, the last portion is disposed, relative to the horizontal, at the lowest level, at an angle which is close to the angle of slope of the material to be handled.

It has been found that the flow of the material out of the corolla-like member was improved if the internal surface of the corolla-like member was fluidized. It is therefore advantageous for the rigid internal surface to be lined with fluidization cartridges, for example by lining the rigid internal surface with a porous fabric of synthetic textile material and by passing an adapted flow of air into the space between the internal surface and the lining. Care must be taken to ensure that the air is diffused over the entire surface area and that preferential circuits are not formed. Porous horizontal sleeves may also be provided from place to place, provided that they do not form excessively substantial swellings which are liable to interfere with the flow of material. Other arrangements are possible and will be left to the ability of the man skilled in the art.

When using a corolla-like member with an inflatable structure, one solution provides that the part of each sausage-like member which faces the region to be fluidized may be made of porous synthetic fabric. By virtue of the continuous escape of air to the interior of the bell-like member, the inflation pressure in the sausage-like members will be lower in this case than the usual pressure obtaining in this kind of structure.

The vacuum which is produced in the bell-like member has the effect of participating in supporting the corolla-like member which is of smaller section and which rests on the pile of material. This supporting action which is produced by the fan for sucking in the dust is stable as it is not dependent on the energy in the downward flow of material and fluctuations therein.

The dimensions of the corolla-like member are governed by the conditions of use of the apparatus. The choice of its structure then determines its weight. These data and the value of the operating depression produced make it possible to calculate the maximum section of the bell-like member.

It should be noted that the corolla-like member forms a chamber in which the dust resulting from the downward fall movement of the material is emitted. Because of the vacuum produced, the outside air enters below the corolla-like member but the atmosphere in the corolla-like member cannot issue therefrom. The dust is therefore not dispersed in the work area in the course of the filling operation.

In spite of the vacuum below the corolla-like member, the suction-cup effect is compensated by the support effect of the bell-like member. The system is self-balanced. In fact, when the corolla-like member approaches the pile of material, the air flow section between its lower opening and the pile decreases, and the pressure drop rises, as also does the vacuum in the corolla-like member and in the bell-like member. Then, because of the difference in sectional area between the bell-like and corolla-like members, the lower surface of the bell-like member lifts the corolla-like member until a distance between the pile of material and the corolla-like member, which corresponds to equilibrium, has been re-established.

The following description of a non-limiting embodiment of an apparatus according to the invention and operation thereof will permit better comprehension of the construction, operation and advantages thereof.

Figure 2:
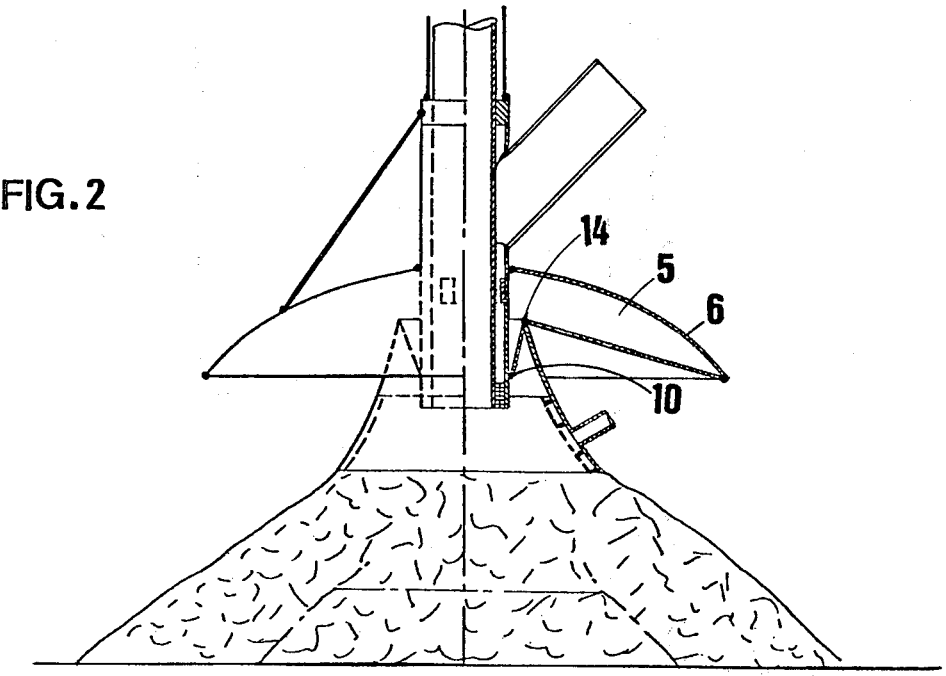

FIGS. 1 and 2 show, half in elevational view and half in axial section, an apparatus according to the invention for handling alumina, with the corolla-like member respectively in the down position and in the up position, with the upper part of the apparatus in the same position, that is to say, at the two ends of the travel movement of the corolla-like member.

Reference numeral 1 denotes the central pipe which is of reinforced rubber, being 0.40 m in diameter.

Reference numeral 2 denotes the outer concentric pipe which is of polyester laminated material, being 0.50 m in diameter and being gripped onto the central pipe by the collar 3.

Reference numeral 4 is the conduit connecting the outer pipe 2 to the suction fan (not shown) for producing a 15 mm vacuum in the bell-like member 5. The volume of the bell-like member is formed between a rigid upper surface 6 and a flexible lower surface 7, 7'. The upper surface 6 which is made of laminated material is pivoted to the outer pipe 2 along the line 8, permitting inclination of 15°. The lower surface 7 and 7' which is made of flexible impermeable fabric is fixed at its outer periphery 9 (3.50 m in diameter) to the upper surface 6 and at its inner periphery 10 to the outer pipe 2.

Reference numeral 11 denotes the openings of the outer pipe 2, which are provided with filter screens and which communicate the interior of the bell-like member 5 with the outer pipe 2 which is under a vacuum.

Reference numeral 12 denotes a bottomless latticed protection basket which extends the outer pipe 2 to prevent the fabric 7, 7' from being sucked in and blocking the air passage.

The horizontal distance between lines 8 and 10 is 0.70 m.

Reference numeral 13 denotes the corolla-like member which is here made of laminated material. It is connected along line 14 to the lower surface of the bell-like member 5. It is of substantially parabolic outline and is 0.50 m in height. The diameter of its upper opening is 0.80 m and the diameter of its lower opening is 1.80 m. At the level of its lower opening, the angle between the surface of the corolla-like member and the horizontal is 30°. The corolla-like member is lined, in its interior and over a height of 0.40 m, with a fluidization fabric 15. Compressed air is introduced at 16 between the corolla-like member and the fabric, at a flow rate of 2 $Nm^3/min/m^2$ so as to improve the flow of the substance out of the corolla-like member. Guys 17 support the upper surface 6 of the bell-like member.

Reference numeral 18 shows the means suspending the apparatus from a lifting arch or portal assembly.

In FIG. 1, the alumina which passes down through the central pipe 1 has formed a pile on which the corolla-like member 13 rests, at the lower limit of its movement. As the alumina passes into the corolla-like member 13, it tends to flow therefrom by virtue of fluidization by means of the compressed air at 16, and the pile rises in height. As the weight of the corolla-like member 13 is balanced by the effect of the vacuum in the bell-like member 5, from the lower surface of which the corolla-like member is suspended, the corolla-like member floats on the pile of material and rises therewith until it reaches the upper limit of its movement as shown in FIG. 2. At that moment, the upper part of the corolla-like member 13 has risen by about 0.80 m relative to the position in FIG. 1 which is partly indicated at the bottom of FIG. 2. The whole of the apparatus then has to be raised by means of the suspension arrangement 18 in order to return to the initial geometry thereof.

The dust caused by the free downward movement of the substance in the central pipe 1 is sucked in towards a filter by the outer pipe 2 and the conduit 4. It therefore does not encroach into the space in which the powder substance is arriving, for example the hold of a ship. On the other hand, the substance arriving at the pile is properly deaerated. With this apparatus, the suction cup effect of the corolla-like member on the pile has not occurred, thus permitting regular use of a flow rate of 1200 t/h.

Finally, it has been verified that the product correctly flows out of the corolla-like member onto the pile, even if the corolla-like member takes up a position of being inclined on the pile at an angle which can be up to 25° with respect to the horizontal.

We claim:

1. Apparatus for handling powder substance formed by a central pipe for downward feed of the substance, an outer concentric pipe for the upward movement of dust, an axial corolla-like member which is open at its two ends and which flares outwardly downwardly and which is disposed below the two concentric pipes, and a suction means communicating with the outer concentric pipe whereby said pipe can be put under vacuum, comprising:

means gripping the upper portion of the outer concentric pipe onto the inner pipe, the outer concentric pipe comprises communication openings provided with filter means, a closed bell-like member is placed around the outer pipe which passes therethrough and to which it is connected sealingly at an upper level and at a lower level, said two levels being disposed on respective sides of the filter communicating openings of the outer pipe while said bell-like member is defined by an upper surface whose outer periphery delimits a constant area and by a lower deformable surface which is suspended between the outer periphery of the upper surface and the connection at the lower level of the bell-like member to the outer pipe, said downwardly flared corolla-like member being coupled by the periphery of its upper opening to the lower surface of the bell-like member along a line intermediate between the outer pipe and the outer periphery of the upper surface and whose lower opening is smaller in section than the largest horizontal section of the bell-like member, said bell-like member being put under vacuum by the suction means, and a means for vertically positioning of the whole of the apparatus.

2. Apparatus according to claim 1 wherein the surface of the bell-like member is of impermeable textile material.

3. Apparatus according to claim 1 wherein the lower surface of the bell-like member is formed by two oppositely directed frustoconical portions.

4. Apparatus according to claim 3 wherein the corolla-like member is connected to the connecting line between the two portions of the lower surface of the bell-like member.

5. Apparatus according to claim 1 wherein the connecting of the corolla-like member to the lower surface of the bell-like member is pivotal.

6. Apparatus according to claim 1 wherein the upper connection of the bell-like member and the outer pipe is pivotal.

7. Apparatus according to claim 1 wherein the upper surface of the bell-like member is coupled by guy means to the outer pipe.

8. Apparatus according to claim 1 wherein the outline of the corolla-like member is substantially parabolic.

9. Apparatus according to claim 1 which includes means for imparting gaseous flow to fluidize a portion adjacent the inner surface of the corolla-like member.

10. Apparatus according to claim 1 wherein the corolla-like member is in the form of an inflatable structure.

11. Apparatus according to claim 1 which includes means for guiding of the central pipe relative to the outer pipe.

12. Apparatus according to claim 1 wherein the central pipe is extended downwardly by a mesh-like portion.

13. Apparatus according to claim 1 wherein the suction conduit opens into the outer pipe at a level between the upper portion and the filter openings of the outer pipe.

* * * * *